Patented Apr. 18, 1950

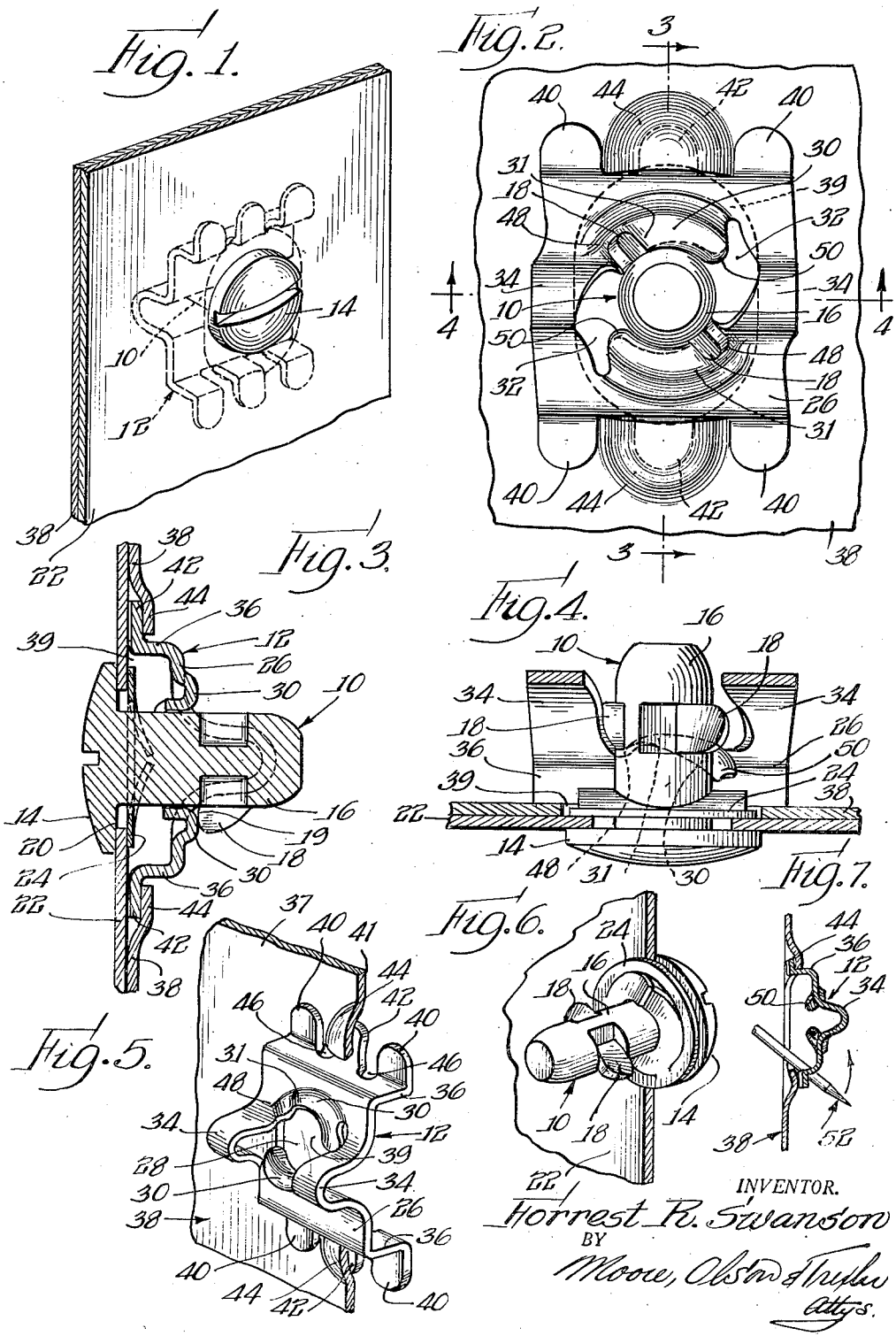

2,504,358

UNITED STATES PATENT OFFICE 2,504,358

FASTENER DEVICE

Forrest R. Swanson, Chicago, Ill., assignor to Illinois Tool Works, Chicago, Ill., a corporation of Illinois Application December 21, 1946, Serial No. 717,787

5 Claims. (Cl. 24—221)

The present invention relates in general to quick operating fasteners for detachably securing panels or work sheets in instances where accessibility for inspection, oiling, adjustment, cleaning or servicing is required.

More particularly, the invention relates to fasteners of the type wherein a stud rotatably secured to one work piece passes through an aperture in a second work piece and engages a resilient locking member secured thereto. To effect an efficient locking coaction, the locking member is engaged by a lug extending laterally from the stud so as to cause flexing of the member toward the work piece upon a relative rotation of the stud to clamp the work sheets together.

One of the objects of the invention is to provide a fastener of the type described which is extremely simple in construction and includes a minimum number of parts, whereby it may be manufactured very economically, and yet retain the ruggedness, durability, speed and ease of operation, and attractive appearance of prior known constructions.

Another object of the invention is to provide a fastener of the above described type wherein the unitary locking member includes means formed integrally therewith for attaching it to a work sheet, without the need for additional fastening devices, such as rivets or screws, heretofore required.

A further object of the invention is to provide a fastener wherein the locking member is constructed so as to promote quick and simple installation thereof, or removal if inadvertently damaged, by unskilled personnel, thereby effecting a considerable saving in installation costs.

Still another object of the invention is to provide an improved quick operating fastener which is adapted to accommodate greater variations in thickness of the work sheets or in alignment thereof than prior constructions, whereby more liberal tolerances are permissible and fewer gradations in fastener sizes need be employed for a given range of work sizes.

Still another object of the invention is to provide a fastener wherein the locking member has integral means to positively limit the rotation of the complementary stud.

These and other objects of the invention will best be understood upon a consideration of the following specification and the accompanying drawing, wherein:

Fig. 1 is a perspective view showing portions of two work sheets clamped to each other by means of a fastener constructed in accordance with the principles of the present invention, as viewed from the normally exposed side of the work;

Fig. 2 is an elevational view of the work sheets and fastener shown in Fig. 1, as viewed from the normally concealed side of the work;

Fig. 3 is a longitudinal sectional view through the fastener and work sheets, taken along the line 3—3 of Fig. 2;

Fig. 4 is a transverse sectional view through the fastener and work sheets, taken along the line 4—4 of Fig. 2;

Fig. 5 is a fragmentary perspective view showing the locking plate of the fastener unit mounted on a work sheet;

Fig. 6 is a fragmentary perspective view showing the stud of the fastener unit mounted on a work sheet; and Fig. 7 is a fragmentary longitudinal sectional view through the locking plate and work sheet showing the manner in which mounting of the locking plate is accomplished.

The fastener disclosed herein comprises two principal portions, one being a rotatable stud 10, which is generally secured to the removable panel or work sheet, and the other portion being a receptacle or resilient locking member 12, which is generally attached to the fixed panel or work sheet. The stud 10, which is not claimed as part of the invention, comprises a head 14, which may be slotted or otherwise adapted to be engaged by a screw driver, wrench, or other suitable means, a shank 16 and laterally extending lugs or wings 18. The shank 16 passes through an aperture 20 in a work sheet 22 to which the stud 10 is operatively secured by a retaining washer 24.

The receptacle or resilient locking member 12 of the instant invention comprises a plate or section 26 having between opposite side portions thereof a stud receiving aperture 28 (Fig. 5), the periphery being adapted to engage the lugs 18 extending from the stud 10. The plate 26 is further provided with a pair of diagonal opposed recesses 32 (Fig. 2) to accommodate the lugs 18. A transversely extending U-shaped portion or channel 34 is formed in the center portion of the locking plate 26 to provide a pair of abutment portions adapted to serve as stops to limit the clockwise rotation of the stud 10, as viewed in Fig. 2. The U-shaped portion also promotes flexibility of the locking plate for quick mounting which will be indicated in material which follows.

The embodiment of the locking plate of section 26, as shown, is formed over along its upper and lower edges to provide a pair of spacing members or flanges 36 for spacing the locking plate 26 a desired distance rearwardly of the work sheet 38 to which it is attached (Figs. 3 and 5). The length of the spacing means will be variable, dependent upon the object to which the locking member 12 is applied and the locking requirements. The work sheet 38 is provided with an elongated aperture 39 (Figs. 3 and 4) through which the stud 10 is extended to engage the locking member 12. At each end of the spacing members or flanges 36, there are laterally extending lugs or tabs 40, constituting base members, which engage the rear surface 37 (Fig. 5) of the work sheet 38. Between each of the pairs of lugs or tabs 40 there is formed a third lug or tab 42 which engages the opposite surface 41 (Fig. 5) of the work sheet 38. The portion of the work sheet 38 engaged by the lugs 42 is preferably provided with dimples or recesses 44 at opposite ends of the aperture 39 (Fig. 3) so that the lugs may be disposed flush with the front face of the work sheet. Also, as may best be seen in Fig. 2, the width of these dimples or recesses 44 in the work sheet 38 should preferably be equal to the space between the pairs of lugs 40 to prevent lateral movement of the locking member 12 with respect to the work sheet 38. The lugs 42 are preferably formed with faces (Fig. 5) to match the contour of the dimples or recesses 44, so as to insure distribution of stresses uniformly over the entire area of the lugs, and to provide means to resist lateral movement of the locking member 12 relative to the work sheet 38 to which it is secured.

In order to mount the locking member 12 to a work sheet, one of the lugs 42 is first fitted into one of the dimples or recesses 44 with the adjacent lugs 40 disposed on the opposite side of the work piece 38, as shown in Fig. 7. The locking member 12 is then flexed until the opposing lug 42 can be slipped under the edge of the remaining dimple 44 through the aperture 39. Once the tip of the second lug 42 is disposed beneath the corresponding dimple 44, the bowed locking member 12 is released and springs outwardly until the portions of the flanges 36 adjacent the lugs 42 abut the edges of the aperture 39 in the work sheet 38.

The flexing of the locking member 12 may be accomplished by means of a small screw driver or a small diameter rod 52 inserted between the lug 42 and an adjacent one of the lugs 40 at the unmounted end of the locking member, and engaging the edge of the corresponding dimple 44 at one side thereof as shown in Fig. 7. A pressure exerted on the rod 52 will cause the locking plate 12 to be flexed and permit engagement of the lugs 40 and 42 on opposed sides of work sheet 38. The U-shaped channel 34 in the locking plate 12 may be in the form of a pair of strap portions between adjacent lug engaging surfaces 30 and considerably increases the effective length thereof and consequently reduces its resistance to such flexing, thereby facilitating mounting of the locking member 12 on a work sheet.

In the event that the locking member 12 after installation is inadvertently damaged to such an extent as to necessitate replacement thereof, efficient means are provided for its removal. It will be noted that the flanges or spacing members 36 are provided with recesses 46 (Fig. 5) adapted to permit the tip of a slender instrument to be inserted adjacent one of the lugs 40 and beneath the edge of one of the dimples 44 to flex the locking member in a manner similar to the manner shown in Fig. 7 to effect removal of the locking member 12 from the work sheet. It is to be understood that other means may be employed for bowing the locking plate 12 during installation or removal thereof, if desired, the construction being such that any pointed implement, such as a scriber, awl or nail will serve the purpose. In an emergency, pliers would even be sufficient, though not as desirable as a pointed instrument, as the surface of plate 12 might be injured.

To clamp the work sheets 22 and 38 together, they are superimposed with the stud 10 extending through the aperture 39 in the work sheet 38 and the aperture 28 in the locking member 12. The stud 10 is then rotated through approximately a quarter turn and the lugs 18 extending laterally therefrom traverse the surface about the aperture 28, thereby flexing the locking plate 12 towards the work sheet 38. It should be noted that this flexing may be caused by having cam surfaces on the locking plate 12 about the aperture, as shown in the drawings, or a cam face on the lugs 18 of the stud 10, or a combination of both. Any of these forms would provide the flexing of the locking plate necessary to obtain locking coaction of the fastener members. As the lugs 18 approach the limit of their travel they may engage detents 48 which are provided adjacent the abutment members 34. These detents prevent undesired counter-clockwise rotation of the stud 10, as viewed in Fig. 1. It is of paramount importance that overrunning of the engaging surfaces 30 by the lugs 18 be positively prevented, inasmuch as the locking plate 12 is oftentimes concealed from view during the fastening operation. Consequently, the operator is unaware of the exact position of the lugs 18 relative to the cam surfaces 30. The abutment members or stops 34 extend abruptly from the locking plate 12 to an extent sufficient to positively preclude any possibility of the lugs 18 overrunning the engaging surface, and to indicate to the operator positively when the fastener is in locked position.

If desired, the length of the aperture 39 in the work sheet 38 may be varied so that some lateral movement of the locking member 12 relative thereto is permitted, whereby a greater degree of misalignment between the openings in the two work sheets may be accommodated than when the blocking member 12 is rigidly secured to its associated work sheet. In general, however, it is preferred to dimension the aperture 39 in the work sheet 38 so that the portions of the flanges 36 adjacent the lugs 42 are urged into engagement with the edges of the aperture 39 to prevent lateral shifting of the locking member 12 relative to its associated work sheet 38.

It should now be apparent that, by reason of the novel features incorporated in the construction of the invention, a fastener has been provided with a locking plate which can be very quickly and simply installed, or removed when necessary, without injury to the work or locking plate. The improved form of locking member is also very economical to manufacture, by reason of its unitary nature and the relatively simple forming operations involved. In addition, since the locking member does not require rivets or screws for mounting, the work sheet is not weakened, as has been the case with all prior locking plates of this type of fastener. Furthermore, by the omission of the base plate heretofore provided in locking devices of this type, greater flexibility of the locking member has been provided whereby more variation in the thickness of the work sheets is permissible, while at the same time the weight of the fastener and the amount of material required for its manufacture is appreciably reduced, and the manufacturing operations materially simplified.

While a particular embodiment of the invention has been disclosed and described by way of illustration, it should be apparent that various modifications may be made therein without departing from the spirit of the invention in its broader aspects and scope of the appended claims.

Having thus described the invention, what is claimed is:

1. A quickly operable fastener for detachably securing work pieces together consisting of a sheet metal body portion which includes a locking plate apertured to accommodate a rotary stud having lateral lugs axially spaced from a head, said locking plate including opposed side portions with spaced lug engaging surfaces on opposite sides of the aperture therethrough, and spacer means projecting from the side portions of the locking plate to support the same in spaced relation with respect to a complementary apertured work sheet whereby to enable lateral stressing of the locking plate toward the work sheet as an incident to stud rotation, and attaching portions integral with the body portion and including a plurality of outwardly extending attaching elements along the side margins of said spacer means for embracing opposite surfaces of the work sheet adjacent the aperture therethrough, said body portion being resilient with the central portion of the locking plate including a pair of flexible strap portions having closed ends connecting said side portions and disposed between said lug engaging surfaces and directed transversely of the plane of the locking plate to facilitate flexing of said side portions with resultant movement of said attaching elements toward each other sufficiently to enable initial association thereof with the work aperture.

2. A quickly operable fastener as claimed in claim 1, wherein the transversely directed strap portions on said locking plate are substantially U-shaped with the openings therethrough in alignment with each other and parallel to said spacer means.

3. A quickly operable fastener as claimed in claim 1, wherein the strap portions of said locking plate extend from said plate in a direction opposite to said spacer means.

4. A quickly operable fastener as claimed in claim 1, wherein the strap portions serve as a stop to limit rotation of the stud toward secured position and wherein there are provided means adjacent said strap portions for resisting retrograde movement of the stud when in secured position.

5. A quickly operable fastener as claimed in claim 1, wherein the strap portions are U-shaped and extend from the plane of the locking plate in a direction opposite to said spacer means and wherein the lug engaging surfaces are provided with recesses adjacent said strap portions to resist retrograde movement of the stud when in secured position.

FORREST R. SWANSON.

REFERENCES CITED

The following references are of record in the file of this patent:

UNITED STATES PATENTS

| Number | Name | Date |
|---|---|---|
| 2,184,783 | Tinnerman | Dec. 26, 1939 |
| 2,309,732 | Johnson | Feb. 2, 1943 |
| 2,334,188 | Gazley | Nov. 16, 1943 |
| 2,421,204 | Jung | May 27, 1947 |